United States Patent [19]

Kurtz et al.

[11] 4,063,209
[45] Dec. 13, 1977

[54] INTEGRAL TRANSDUCER ASSEMBLIES EMPLOYING BUILT-IN PRESSURE LIMITING

[75] Inventors: Anthony D. Kurtz, Englewood; Joseph R. Mallon, Alpine, both of N.J.

[73] Assignee: Kulite Semiconductor Products Inc., Ridgefield, N.J.

[21] Appl. No.: 573,624

[22] Filed: May 1, 1975

[51] Int. Cl.² .............................................. G01L 1/22
[52] U.S. Cl. ........................................ 338/4; 338/36; 338/42
[58] Field of Search ................. 338/2, 4, 47, 36, 42; 73/88.5 SD; 357/26; 29/580

[56] References Cited

U.S. PATENT DOCUMENTS

| 3,417,361 | 12/1968 | Heller et al. | 338/4 X |
| 3,568,124 | 3/1968 | Sonderegger | 338/4 |
| 3,737,684 | 6/1973 | Kuno et al. | 73/88.5 SD |

Primary Examiner—C. L. Albritton
Attorney, Agent, or Firm—Arthur L. Plevy

[57] ABSTRACT

A transducer of an H-shaped cross section employs a depression relatively equal to the line width of a diffused piezoresistor located in said depression. The depression is sealed by means of a glass member which acts as a "stop" for the transducer for all forces in excess of a rated force which causes a maximum diaphragm deflection relatively equal to the depth of said depression as selected in accordance with said resistor line width and the overall diaphragm diameter.

14 Claims, 16 Drawing Figures

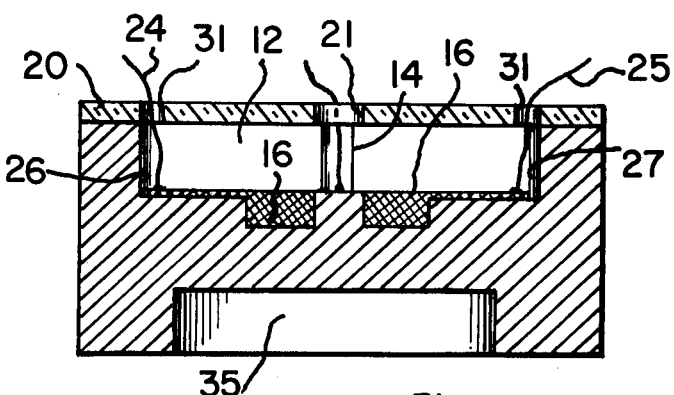
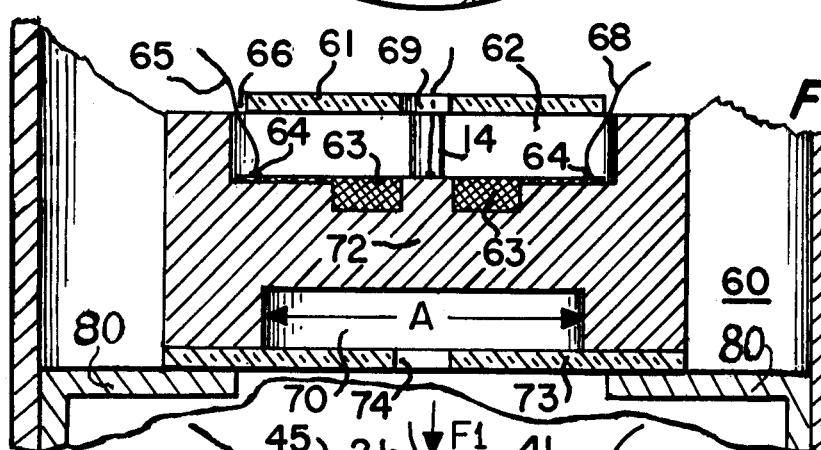
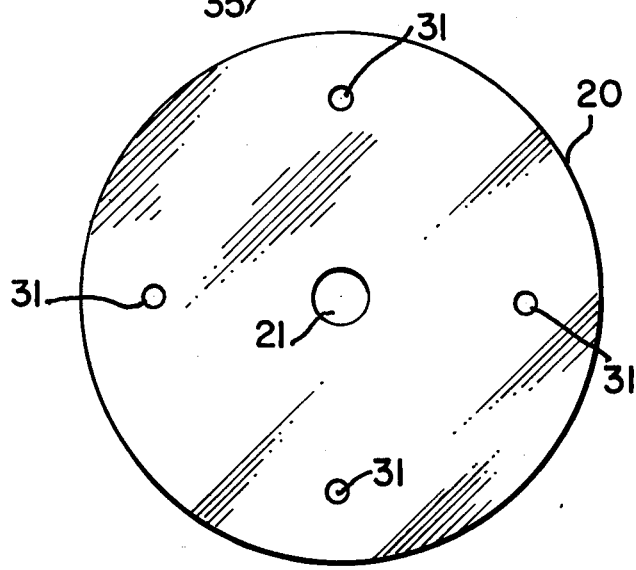
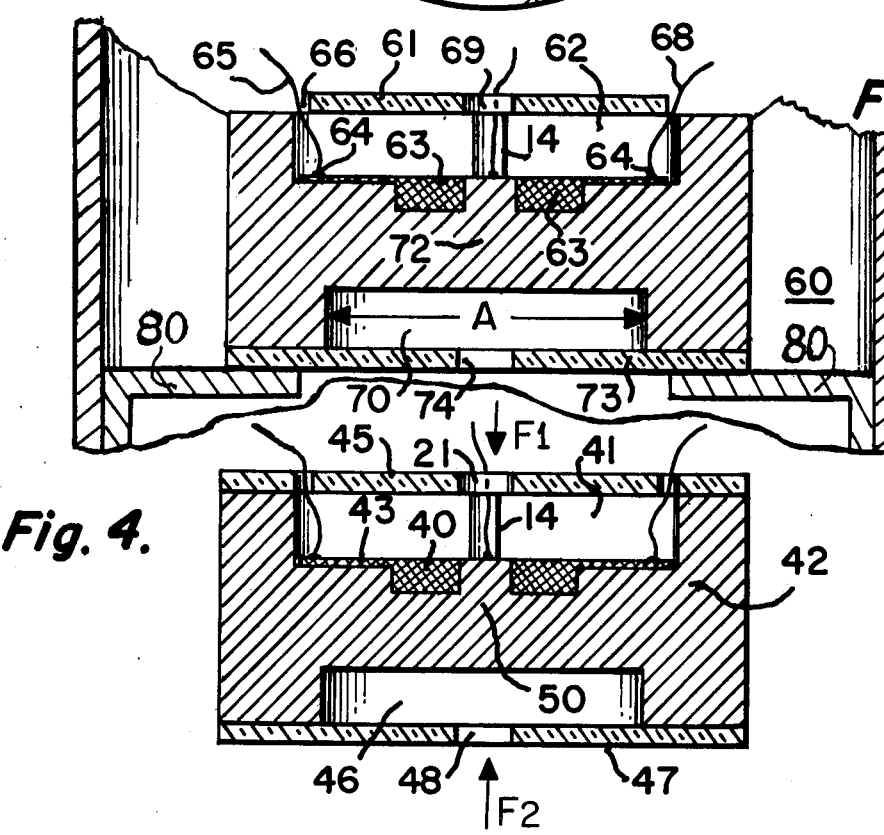

INTEGRAL TRANSDUCER ASSEMBLIES EMPLOYING BUILT-IN PRESSURE LIMITING

BACKGROUND OF INVENTION

This invention relates to electromechanical transducers and more particularly to an integral H-shaped transducer employing piezoresistive elements.

The use of the well known piezoresistive effect in semiconductors has made possible the construction of electromechanical force transducers with substantially enhanced output and operating characteristics.

The technology employed is currently in step with that used in the fabrication of integrated circuits and modern day transistor technology.

Thus the prior art is replete with a plethora of technical articles and patents which describe various embodiments of such units.

A particular advantage is that by using such techniques, one can fabricate relatively small and reliable transducers to be employed in the aerospace, medical and other fields as well. The transducers can, in general, be referenced to as miniature or ultraminiature and typically have deflecting diaphragms of silicon or glass or other materials which are on the order of 0.1 inch or so in diameter with thickness between 0.0005 to 0.050 inches.

Many significant technical problems had to be overcome during the development of such devices. For example, one problem in particular, affected the resonant frequencies of the transducers. It was discovered that the leads coupled to the piezoresistor and the associated terminals had to be isolated to prevent spurious frequencies affecting the operation. A solution to such a problem is shown in U.S. Pat. No. 3,654,579 entitled "Electromechanical Transducers and Housings" patented on Apr. 4, 1972 by A.D. Kurtz, et al, and assigned to the assignee herein.

Together with the problem of lead isolation, the manufacturer was faced with further problems in the fabrication and reliable control of such miniature devices. These problems relate to mechanical stability of the device. That is, as the unit becomes smaller, the fabrication becomes more difficult. Certain of these and related problems are described and solutions as well as apparatus are offered in U.S. Pat. No. 3,739,315 entitled "Semiconductor Transducers Having H Shaped Cross Sectional Configurations" by A.D. Kurtz, et al, issued on June 12, 1973 and assigned to the assignee herein.

This patent describes a composite transducer employing a cup and a ring which are bonded together to form an "H" shaped cross sectional unit.

In any event, there is a demand for reliability and increased performance in regard to such transducers. A major problem which has been attendant with a great deal of difficulty is the ability to "stop" or limit the movement of the diaphragm associated with such transducers for pressures applied thereto in excess of rated pressures.

Consider that the diaphragms employed in such transducers are relatively thin and small in diameter as indicated above. This fact alone makes certain prior art stop techniques inapplicable. The prior art, while cognizant of the overload problem, utilized stopping pins, or adjustable pins and screws in apertures to stop a diaphragm. Other prior art techniques involved bosses machined into the housing or elsewhere to provide stops for the diaphragm. Due to the physical size of these ultraminiature diaphragms, one could not machine to such close tolerances and hence, these stops are not possible. Another major problem in small transducers of the type described above, is that the diaphragms are typically fabricated from silicon or glass and are extremely small. These materials as silicon, glass and so on, are very brittle. Hence, the problem of stopping a small brittle diaphragm which exhibits extremely small deflection for applied pressure is considerable. Furthermore, one must be able to fabricate the diaphragm to thus maintain its size, to assure reliable operation and further assure that the stop mechanism will operate so that excessive force or pressure applied to the diaphragm will not rupture, fracture or destroy the same.

Accordingly, it is an object of the present invention to provide an improved semiconductor pressure transducer incorporating a stop mechanism, while exhibiting reliable operating characteristics.

BRIEF DESCRIPTION OF PREFERRED EMBODIMENT

An electromechanical transducer for responding to the magnitude of an applied force, comprising of a semiconductor member having a depression of a predetermined depth located on a first surface thereof, at least one piezoresistive element diffused within said depression and located relatively centrally and comprising a serpentine line configuration having a line width approximately equal to said predetermined depth, and pressure limiting means coupled to said member to cover said depression to restrain said semiconductor material containing said element from moving beyond said pressure limiting means.

BRIEF DESCRIPTION OF FIGURES

FIG. 3 is a cross sectional view taken through line 3—3 of FIG. 1G.

FIG. 4 is a cross sectional view of an alternate embodiment showing a differential pressure transducer.

FIG. 5 is a cross sectional view of an alternate embodiment.

FIG. 6 is a top plan view of an alternate glass stop member used in this invention.

DETAILED DESCRIPTION OF FIGURES

Before proceeding with a detailed description of the Figures, it is noted that the series of Figures designated as FIG. 1 and those designated as FIG. 2 depict respectively, a side view and a top view of the same process step, hence similar numerals will be utilized to describe like components.

Figure 1A:
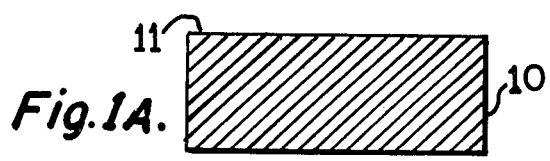
FIGS. 1A to 1G are side elevational views depicting a series of steps utilized in fabricating a transducer according to this invention.
Figure 2A:
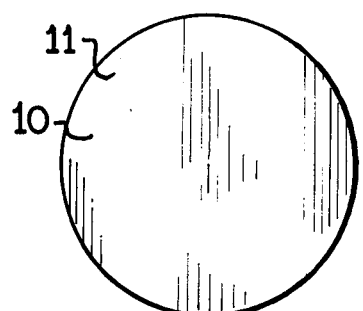
FIGS. 2A to 2E are top plan views of the steps shown in FIGS. 1A to 1E.

FIGS. 1A and 2A show a side view and top view respectively of a relatively thin disk-like piece of silicon 10.

The top surface 11 of the silicon 10 is polished and smoothed. Normally, as shown in the prior art, piezoresistors would then be diffused directly into the top surface of the silicon disk 10 by means of employing oxide masking and photolithography and thereafter selectively diffusing.

In any event, this is not done and instead a depression 12 of a very small depth is formed on the top surface 11 of the semiconductor or silicon wafer 10.

Figure 1B:
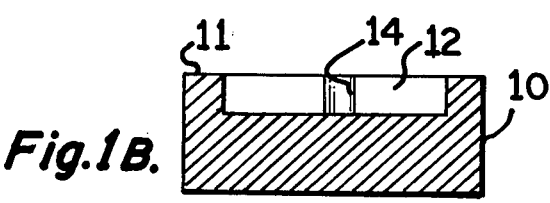
Figure 2B:
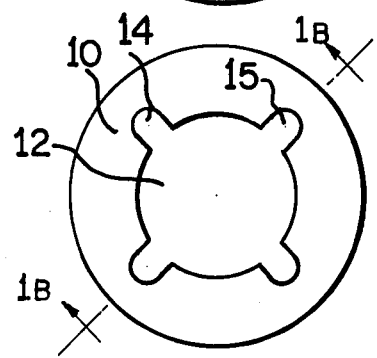

Referring to FIGS. 1B and 2B, the depression 12 is shown. The depression is relatively circular (FIG. 2B), and has extending therefrom, a plurality of "finger-like" terminal depressions as 14 and 15. The diameter of the depression will define the active area of the diaphragm, while the extending terminal areas as 14 and 15, extend into the non-active area of the diaphragm. As known in the art and as shown by U.S. Pat. No. 3,654,579, the leads emanating from a transducer should preferably be located on the non-active area of the diaphragm and be retained or otherwise isolated to avoid spurious resonances which affect the operating frequency of the diaphragm.

The depression 12 is etched or otherwise formed on the surface of the silicon part 10. The etching process can be accomplished by the use of a surface mask and then after selective removal of oxide, one can use an acid to attack the silicon, but not the oxide to form a depression as 12. Such chemicals may be buffered hydroflouric-nitric acid solutions and so on. These attack the silicon but not the silicon dioxide.

In any event, a depression as 12 is formed and is basically, as will be explained, between 1/10 of a mil to ½ of a mil deep. The exact depth is determined by the diameter and pressure rating of the diaphragm. For example, for diaphragms having active diameters on the order of one-quarter inch, the depth of the depression 12 would be about ½ mil, in diaphragms of between 0.03 to 0.08 inches more or less, the depth of the depression 12 would be about 1/10 of a mil. This relationship between depth and diameter is not critical and for example, one may desire to stop large diaphragms at small distances, but as a rule of thumb and only an approximation, the maximum depth can be related to the maximum diameter in certain diaphragm types.

In any event, it is believed that such depths for such diameters cannot be greatly exceeded as it then becomes difficult, if not impossible, to diffuse into a deeper hole. The problem is attendant with the masking and diffusion process.

This is so as when one desires to expose a mask or emplace a photolithographic mask in a depression for purposes of subsequent diffusing, one will experience diffraction of the light as well as errors caused by the lack of perfect collimation of light and hence the depth of the hole must be minimized. That is a reason why the prior art taught optical flats on the silicon surface in order to obtain proper exposure and mask registration. However, based on the diameter of the unit and based on these depths, one can in fact, use a well collimated light source to provide a mask within relatively shallow depressions as 12 of FIB 1B and 2B. However, for greater depth with the same diameter, one may experience a problem in developing images in the photolithographic layer.

Figure 1C:
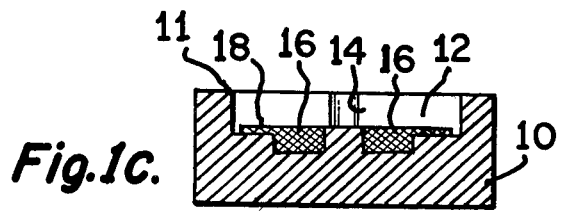
Figure 2C:
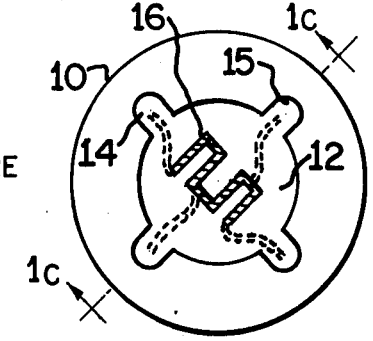

Referring to FIGS. 1C and 2C, there is shown a piezoresistance circuit configuration 16 diffused in the depression 12 of the silicon wafer 10.

Diffusion is conventionally accomplished by the use of a silicon oxide layer to provide a selective mask against the diffusion of certain donor and acceptor impurity atoms. An oxide layer may be produced thermally in oxidizing ambients such as dry or wet oxygen and water saturated non-reducing gases at temperatures between 800° – 1200° C. The range of oxide thickness is between 1000 to 30,000 angstroms.

A photolithographic technique is then used to remove the oxide. This is done by spreading a uniform photo sensitive film over the oxide, masking portions of the film with a mask, and exposing the assembly to ultraviolet radiation. The exposed portion of the photosensitive film becomes insoluble, whereas the masked portion is soluble in a developing solution or the reverse if a positive photoresist is used.

The oxide can then be removed in those areas where the film has been removed by etching with a buffered HF acid. Very intricate strain gage or piezoresistive patterns can be accommodated.

Essentially, as shown in FIG. 2C, the piezoresistor pattern is a series of serpentine line patterns, although a single line resistor can be made, as well. As is known, the resistance of a piezoresistor as 16 or any resistor is directly proportional to its length and inversely proportional to the cross-sectional area. Thus, in order to achieve high resistance values on very small areas, one needs to provide a fine line resistor to reduce cross-section and to meander the path of the piezoresistor as a serpentine configuration, to achieve a long length in a small area.

The width of the line of the resistor becomes a function of the diameter of the diaphragm. This is also true of the depth of the recess or depression 12, as above indicated.

It was known that for diaphragms having active diameters of 0.03 to 0.080 inches, the width of the resistor lines was about 1/10 of a mil, and about ½ of a mil for the larger diameter diaphragms. The relationship, as indicated, is a loose one and the line width can be smaller for larger diaphragms and so on.

One can now ascertain a very important fact completely overlooked or not considered by the prior art. Namely, the required line width of the resistor is, in fact, closely related to the required depression depth for stopping a given diameter diaphragm of a given pressure rating.

For a small diaphragm, the deflection needed for maximum deflection by a pressure is, in fact, related to the resistor line width. Thus, a 0.03 to a 0.05 inch diameter diaphragm will deflect for a maximum rated force approximately 1/10 of a mil. Forces which tend to cause greater deflection are excessive and could rupture, fracture or destroy the diaphragm. Hence, one would desire to limit the deflection of the diaphragm by an amount approximately equal to the line width of the piezoresistor or by an amount equal to the depth of the depression 12, which is relatively equal to the line width of the resistor.

The piezoresistor 16 can be diffused in the depression 12 because, as above indicated, the depth of the depression is small or relatively equal to the line width of the piezoresistor 16.

The piezoresistor 16 is then formed by diffusion via the windows or openings provided in the silicon oxide mask.

Figure 1D:
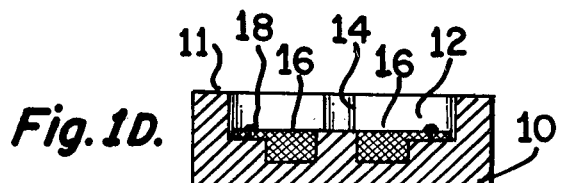
Figure 2D:
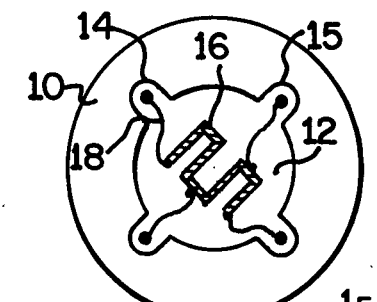

Referring to FIGS. 1D and 2D, contact lands may now be positioned and emplaced on the silicon. The terminal or contact lands extend into the "finger-like" projections as 14 and 15 associated with the depression 12. The contact lands as 18 and 19 are metallized and can be fabricated by an aluminum evaporation process wherein aluminum is evaporated over the surface 11 of the assembly and is preferentially removed. Other methods involve simultaneous electroplating, sputtering and so on.

Thus, as shown in FIGS. 1D and 2D, one now has a transducer or a piezoresistor configuration 16 located on a thin silicon member 10 having terminal areas as 14 and 15. The unit has been fabricated in the depression 12 having the terminal areas running in the "finger-like" projections.

Figure 1E:
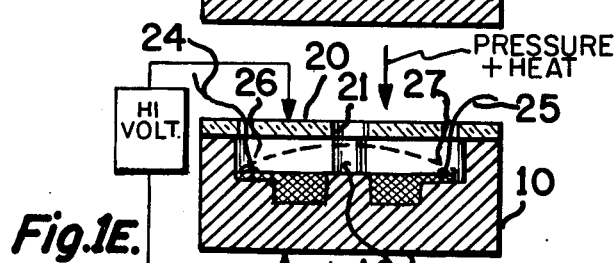
Figure 2E:
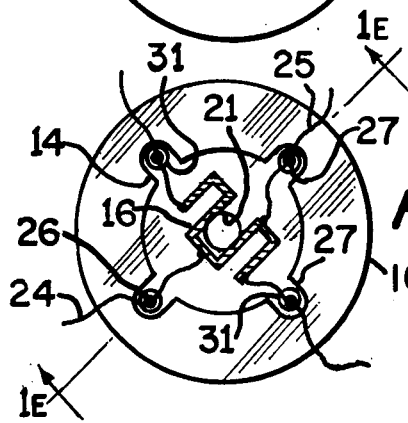

Referring to FIGS. 1E and 2E, a glass covering member 20 is bonded to the top surface of the semiconductor transducer assembly 10 by means of a diffusion bond.

The glass member 20 is fabricated from one of a number of suitable glasses. Examples of such bonding techniques may be had by reference to U.S. Pat. No. 3,256,598 entitled "Diffusion Bonding" by I.R. Kramer, et al issued on June 21, 1966.

Basically, the glass member 20 is a relatively thick disk of glass which may have a central aperture 21 serving as a pressure port. The glass piece is held under pressure and at an elevated temperature into close contact with the silicon member 10. The glass is of a larger diameter than the diameter of the depression 12, having apertures 31 aligned with the ends of the "finger-like" projections. A glass cover sheet 20 with the lead apertures 31 is shown as a top view in FIG. 6.

A relatively high voltage on the order of 400 to 1500 volts D.C. is applied between the glass part and the silicon part. The temperature is between 300° C to 500° C. At this temperature, the glass becomes slightly conductive and a bond is formed between the glass 20 and the silicon piece. The voltage and pressure applied assure intimate bond between the glass and the silicon and such bonds may be on the order of 20 to 200 angstrom units thick.

Leads as 24 and 25 can now be attached via the apertures 31 and to the contacts 26 and 27 in the finger-like projections. The leads can be welded, ballbonded, soldered or otherwise emplaced thereon. The glass member 20 now serves to clamp the inactive portion of the diaphragm. The glass 20 is chosen to thermally match the silicon and provides therewith a thermally and dimensionally stable structure exhibiting relatively insignificant mechanical and thermal hysteresis. The leads 24 and 25 are located on the inactive area of the diaphragm and hence, are isolated and do not affect the overall response of the diaphragm as they are directed through the apertures 31 in the glass member 20. Under high pressure loads, the silicon will contact the glass and further deflection will be stopped as the glass serves as a "stop" surface for the brittle silicon diaphragm.

The emplacement of such leads as 24 and 25 can be added at any convenient stage. The aperture 31 may also be filled with a glass or epoxy 68 to retain the leads in the aperture or to seal the same.

It is noted that the apparatus shown in FIGS. 1E and 2E is a pressure transducer having a glass plate 20 sealing the same at the top. For a force F applied in the direction shown, the diaphragm will deflect a maximum amount until it impinges on or touches the glass plate 20 (shown dashed). It will be restrained from deflecting further by the glass plate which acts as a stop for the brittle silicon diaphragm. Thus, the transducer can be clamped or mounted to a housing at the surface containing the glass member and a force F applied, as shown. The diaphragm portion of the unit cannot deflect beyond the barrier provided by the glass member 20, which serves as a built-in stop. For larger forces than F, the diaphragm does not break as silicon can deflect without rupture within the dimension of the depression's depth 12 and hence, one has a built-in stop. Furthermore, the leads 24 and 25 which extend into the "finger-like" projections are isolated from the deflection portion of the diaphragm via location of the same within the apertures 26 and 27 and hence, the unit exhibits good frequency and operational responses.

In any event, to fabricate the transducer from a piece of silicon as 10 of FIG. 1A to provide the structure shown in FIG. 1E, is one technique. One may use a relatively thicker piece of silicon and lap as polish the surface 30 to a desired thickness (FIG. 1E).

Figure 1F:
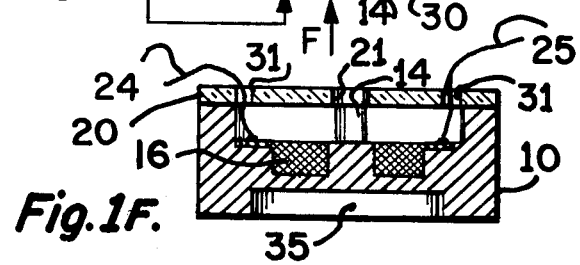

However, as shown in FIG. 1F, if one starts with a thick piece of silicon, one can implement the above described fabrication steps concerning oxide masking and photolithography, diffusion, contact metallization and lead attachment.

Before or after the above steps, including the attachment of the glass cover member 20, one can then etch a depression 35 (FIG. 1F) in the opposite surface of the transducer assembly, as shown. The hole 30 has a diameter equal to the active area of the diaphragm (FIG. 1G) shown dashed, which is approximately equal to the diameter of the depression 12, not including the area covered by the "finger-like" extensions.

Figure 1G:
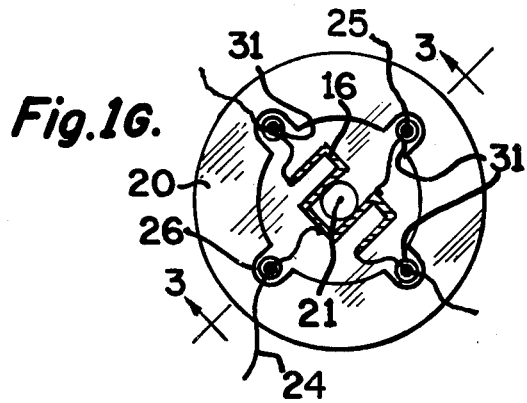

FIG. 3 shows a cross sectional view taken through line 3—3 of FIG. 1G. The diameter of the depression or aperture 35 defines the active area A of the diaphragm, as the piezoresistive configuration 16 is located thereon and the thickness of silicon between depression 12 and depression 35 is made to be thin as required for a diaphragm of a given diameter.

The thin portion, therefore, will deflect most readily upon application of a force to the assembly. It is noted in FIG. 3, that the contacts and leads emanating therefrom are on the non-deflecting portion of the diaphragm and do not readily deflect.

It is also noted that the silicon member has an H-shaped cross section and is formed from an integral piece of silicon.

The "H" may have a smaller depression 12 on top and a larger depression 35 on the bottom; which defines the active area of the transducer.

Referring to FIG. 4, there is shown a transducer assembly in cross section with a piezoresistive pattern 40 diffused within a small depression 41 on a piece of silicon 42. Terminals 43 are directed within the "finger-like" aperture and leads brought out as indicated above. A top glass cover sheet 45 with an aperture is secured to cover the depression 41. A bottom depression 46 is then etched as in FIG. 1F and FIG. 3 and this depression is then covered by a glass sheet 47, also having an aperture 48.

The glass sheets 45 and 47 serve as dual stops for the diaphragm portion 50 defined by the crossarm of the H for forces applied in either direction.

The depression 46 could also be made to a depth equal to depression 41 and hence, the diaphragm 50 will be stopped in both directions for forces, as F1 and F2, as shown. The configuration shown in FIG. 4 can be used as a differential pressure transducer and therefore, provide a reading of the difference between forces, as F1 or F2. The unit has a double stop provided by the top glass layer 45 and the bottom glass layer 47 and the leads, as above indicated, are isolated as being located on the nonactive area of the unit.

Although the stops and depressions 46 and 41 are shown symmetrical, they need not be and one could be deeper or less than the other to provide for more or less force in one direction as compared to another.

Referring to FIG. 5, there is shown a cross sectional view of another embodiment of a transducer 60 with a different glass cover member 61 to enable isolation of the leads.

The unit shown has a depression 62 of the same dimension as to depth and diameter as above described.

A piezoresistive pattern 63 is diffused and contacts brought out to the edges of the "finger-like" projections associated with the depression 62.

In this configuration, the glass plate 61 is of a larger dimension than the diameter of the depression 62, but not large enough to cover the ends 64 of the "finger-like" projections.

Thus, where the glass plate 61 overlaps the projections, an aperture 66 is formed and leads as 65 and 68 can be brought out via the apertures thus formed.

A bottom aperture 70 is also formed and may be of the same diameter than the top depression 62, but can be of the same depth or a different depth. The bottom depression 70 will define the active area of the diaphragm portion 72 of the integral H-shaped transducer 60. The bottom depression is also covered with a glass stop plate 73 having an aperture 74, to provide a dual stop.

The entire unit can then serve as a differential pressure transducer. As shown in FIG. 5, it is mounted to a housing (cross section) 80.

The top portion may be immersed in a force or pressure transmitting oil or fluid. Since the apertures are opened, the fluid can enter the depression 62.

The bottom depression 70 is exposed to some other force or pressure transmitting environment and hence, the diaphragm 72 responds to the difference between the force exerted via the depression 70 as compared to the force exerted via depression 62.

It is noted that the above described transducers have the leads isolated as being on the non-active area of the unit, while they possess stop units implemented by the glass covering sheets and hence, provide all the desired operating characteristics of prior art units together with the stop feature, which has been a long-sought-after characteristic of such transducers employing brittle diaphragms as silicon or glass.

Hence, a major aspect and use of the above described units is that one can provide stops for glass or silicon diaphragms by the selective etching of depressions. This process as a chemical milling operation can be closely controlled and very small dimensioned depths of depressions can be afforded simply and economically.

Because of its chemical and single crystal properties, silicon can be chemically milled to an order of magnitude higher degree of control than common structural materials; using oxide masking, photolithography and selected chemical and electrical etching. Since silicon exhibits no plastic deformation at assembly temperatures, these tight dimensional tolerances are maintained in an assembled structure.

Also, one has complete control of both the depth of the top and bottom depressions as 62 and 70 of FIG. 5, hence, one can make the top depression shallower than the bottom or vice-versa. Hence, this would enable the transducer to respond to less than rated pressure in one direction as compared to another. This contemplates a non-symmetrical pressure operation.

Many other uses of this apparatus will become apparent to those skilled in the art, such as multiple depressions or concentric depressions and so on.

All such embodiments are deemed to be encompassed by the claims appended hereto.

We claim:
1. An electromechanical transducer for responding to the magnitude of an applied force, comprising:
   a. a semiconductor member having a depression of a predetermined depth located on a first surface thereof,
   b. at least one piezoresistive element diffused within said depression and located relatively centrally and comprising a given line configuration having a line width selected in accordance to said predetermined depth,
   c. pressure limiting means including a layer of glass coupled to said semiconductor member to cover said depression to restrain said semiconductor material containing said element from moving beyond said pressure limiting means.
2. The electromechanical transducer according to claim 1 wherein said semiconductor member is silicon and said layer of glass having a diameter slightly larger than that of said depression to cover the same and coupled to said silicon member by a diffusion bond.
3. The electromechanical transducer according to claim 1 wherein said depression is generally circular in shape.
4. The electromechanical transducer according to claim 1 wherein said predetermined depth is between 0.01 to 1.0 mils.
5. An electromechanical transducer for responding to the magnitude of an applied force, comprising:
   a. a semiconductor member having a depression of a predetermined depth and of a given surface dimension located on a first surface thereof,
   b. at least one piezoresistive element diffused within said depression in a relatively central region thereof, and comprising a given line configuration having a line width selected in accordance with said predetermined depth,
   c. a sheet of glass of a dimension greater than said surface dimension secured to said semiconductor member to cover said depression, said glass sheet having a plurality of apertures located on the surface thereof and aligned to surround said central region within a non-active area,
   d. output leads coupled to said piezoresistive elements and directed through said apertures in said glass sheet.
6. An electromechanical transducer for responding to the magnitude of an applied force, comprising:
   a. a semiconductor member having a depression of a predetermined depth located on a first surface thereof,
   b. at least one piezoresistive element diffused within said depression and located relatively centrally and comprising a given line configuration having a line width selected in accordance with said predetermined depth,
   c. a sheet of glass coupled to said semiconductor member for covering said depression to restrain said semiconductor material containing said element from moving beyond the position occupied by said sheet.
7. The transducer according to claim 6 wherein said depression is generally circular in shape with extending finger-like projections.
8. The transducer according to claim 7 wherein said glass sheet has a plurality of apertures located therein and each aligned with an end portion of a selected one of said projections for accommodating a lead wire.

9. The transducer according to claim 7 wherein said glass sheet is larger than said depression, but not large enough to cover the outermost portion of said extending finger-like projections to form a series of wire accommodating apertures about the periphery of said glass sheet and said outermost portion of said finger-like projections and a second depression formed on an opposite surface of said semiconductor member and positioned relatively coaxially with said depression on said first surface, said second depression being of a diameter less than said depression on said first surface to define an active deflection area for said semiconductor member.

10. An electromechanical transducer for responding to the magnitude of an applied force, comprising:
   a. a semiconductor member having an H-shaped cross section with a top depression and a bottom depression, each of a predetermined depth and located relatively coaxially, one on a top surface and one on a bottom surface of said semiconductor, with the area between said depressions forming the central arm of said "H" to define an active region of a diaphragm adapted to deflect upon application of said force thereto,
   b. at least one piezoresistive element diffused on said central arm of said "H" within said active area, said piezoresistive element comprising a serpentine line configuration of a line width relatively equal to the depth of said depressions,
   c. first and second glass sheets, one secured to said top surface and one secured to said bottom surface to cover said depressions to form a barrier for restraining said diaphragm from deflecting beyond said glass sheets for all directions of forces applied to said top or bottom surfaces.

11. The transducer according to claim 10 wherein said top depression has a plurality of finger-like projections extending therefrom and containing terminal means coupled to said piezoresistive element, and said bottom depression of a diameter less than the total diameter of said top depression such that said active region of said diaphragm does not include at least a portion of said finger-like projections.

12. Apparatus for use as a diaphragm with an integral stop for positioning pressure transducer elements thereon, comprising:
   a. a housing including a central depression of a relatively small depth on a surface thereof, said housing being of a U-shaped cross section with the area located between the arms of said "U" defining a diaphragm portion and being of a thickness for deflecting readily upon application of a pressure thereto,
   b. a layer of glass secured relatively congruent with said surface of said housing and bonded to the top portion of the arms of said U to cover said depression and to serve as a stop for deflections of said diaphragm exceeding the length of said arms.

13. The apparatus according to claim 12 further including at least one piezoresistor element mounted on said area and located between said arms of said U; said element positioned relatively centrally with respect to said arms of said U.

14. The apparatus according to claim 13 further including a second depression formed beneath said area containing said piezoresistive element.

* * * * *